(12) United States Patent
Yen et al.

(10) Patent No.: US 7,884,991 B1
(45) Date of Patent: Feb. 8, 2011

(54) STRUCTURE AND METHOD FOR REALIZING ELECTROMAGNETICALLY-INDUCED TRANSPARENCY

(75) Inventors: Ta-Jen Yen, Hsinchu County (TW); Chia-Yun Chen, Kaohsiung (TW)

(73) Assignee: National Tsing Hua University, Hsinchu (TW)

( * ) Notice: Subject to any disclaimer, the term of this patent is extended or adjusted under 35 U.S.C. 154(b) by 52 days.

(21) Appl. No.: 12/506,845

(22) Filed: Jul. 21, 2009

(51) Int. Cl.
*G02F 1/01* (2006.01)
*G02F 1/35* (2006.01)
*G02F 1/39* (2006.01)
*H01P 7/02* (2006.01)
*H01P 7/00* (2006.01)

(52) U.S. Cl. .................... 359/240; 359/330; 333/221; 333/235

(58) Field of Classification Search .................. 333/219, 333/220, 221, 235; 343/700 MS, 911 R; 359/240, 241, 244, 321, 326, 330
See application file for complete search history.

(56) References Cited

U.S. PATENT DOCUMENTS 7,525,711 B1 * 4/2009 Rule et al. ................. 359/244

7,683,444 B2 * 3/2010 Tonucci ...................... 257/421
2009/0057604 A1 * 3/2009 Yen et al. ................. 252/62.55
2009/0160718 A1 * 6/2009 Yen et al. .................... 343/742

OTHER PUBLICATIONS

Harris, "Electromagnetically Induced Transparency," Physics Today, Jul. 1997, pp. 36-42.
Boller et al., "Observation of Magnetically Induced Transparency," Physical Review Letters, May 20, 1991, pp. 2593-2596, vol. 66—No. 20.

* cited by examiner

*Primary Examiner*—David N Spector
(74) *Attorney, Agent, or Firm*—Muncy, Geissler, Olds & Lowe, PLLC (57) ABSTRACT

The present invention discloses a structure and method for realizing electromagnetically-induced transparency. In the present invention, a first split-ring resonator and a second split-ring resonator form a resonance structure. The first split-ring resonator and the second split-ring resonator are made of a conductive material. The first split-ring resonator has a "U" shape with a containing space. The second split-ring resonator has a "rectangular loop" shape with a gap or has a "U" shape with an opening. The second split-ring resonator is inserted into the containing space with the gap or opening arranged inside the containing space and faced downward to form the resonance structure. The resonance structures are periodically arranged on a chip to form an array. Thereby, different-frequency electromagnetic waves can be used to generate electromagnetically-induced transparency via regulating the dimensions of the resonance structure.

10 Claims, 8 Drawing Sheets

STRUCTURE AND METHOD FOR REALIZING ELECTROMAGNETICALLY-INDUCED TRANSPARENCY

FIELD OF THE INVENTION

The present invention relates to a structure and method for generating a phenomenon similar to the atomic-scale electromagnetically-induced transparency (EIT), particularly to a structure and method for arbitrarily regulating the frequency of the electromagnetic wave generating EIT.

BACKGROUND OF THE INVENTION

EIT (Electromagnetically Induced Transparency) is a phenomenon that a resonant laser (usually referred to as a probe laser) is not absorbed by a medium. In other words, the medium is transparent for the probe laser. The transparency is induced by a coupling laser.

Via the very special quantum effect, light is slowed down or even trapped in the medium. Many optical control-related applications may be derived from the special quantum effect, such as optical switches or photonic computers. However, as stated in the document, by Stephen E. Harris, Physics Today, July, 37-42 (1997), and the paper by K. J. Boller, Physical Review Letters, vol. 66, number 20, 2593-2596 (1991), the very special quantum effect can only be realized in a very crucial condition, such as a low-temperature environment and a very intense coupling laser. Further, an arbitrary electromagnetic wave is unable to realize the special quantum effect, and the frequency of the incident electromagnetic wave generating EIT of an atom is limited by the characteristic of the atom. Thus, the special quantum effect is hard to apply to electronic components, and the application thereof is pretty limited.

SUMMARY OF THE INVENTION

The primary objective of the present invention is to provide a structure and method for realizing electromagnetically-induced transparency (EIT), which uses a simple dimensional control of the resonance structures to make different-frequency incident electromagnetic waves generate EIT.

The present invention proposes a structure and method for realizing electromagnetically-induced transparency. The structure of the present invention comprises a chip and a plurality of resonance structures. Each resonance structure is made of a conductive metallic material, arranged on the chip, and includes a first split-ring resonator and a second split-ring resonator. The first split-ring resonators and the second split-ring resonators are arranged corresponding to each other one by one on the chip to form an array of the resonance structures. The first split-ring resonator has a "U" shape with a containing space, and the second split-ring resonator has a "rectangular loop" shape with a gap. The second split-ring resonator is inserted into the containing space with the gap arranged inside the containing space and faced downward.

Based on the abovementioned structure, the method of the present invention regulates the spacing between the first split-ring resonator and the second split-ring resonator and provides an electromagnetic wave incident onto the resonance structures to realize electromagnetically-induced transparency.

Via the abovementioned structure and method of the present invention, the frequency of the electromagnetic wave generating EIT is no more limited by the characteristic of material but can be designed according to practical requirement, and EIT can thus be realized with a single electromagnetic wave at an ambient temperature. Thus is expanded the application of EIT.

DETAILED DESCRIPTION OF THE PREFERRED EMBODIMENTS

Below, the technical contents of the present invention are described in detail in cooperation with the drawings.

Figure 1:
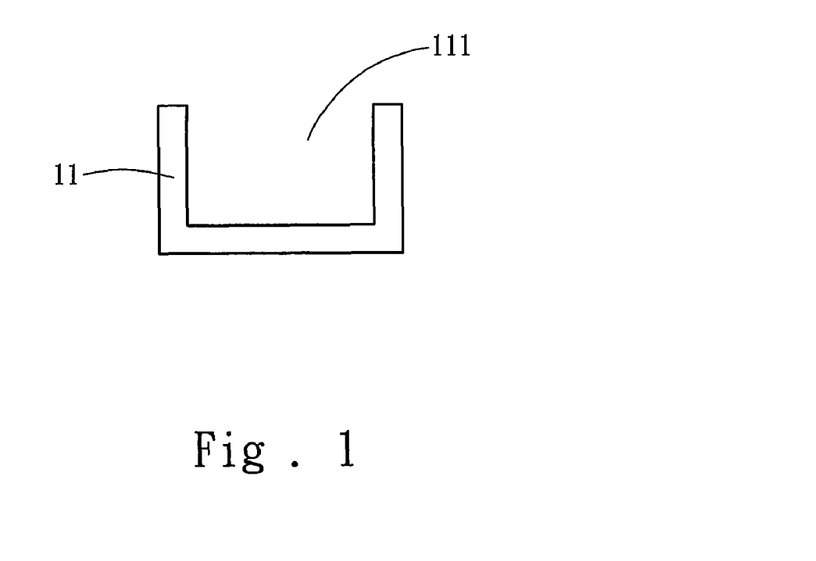
FIG. 1 is a diagram schematically showing a first split-ring resonator according to the present invention.
Figure 2:
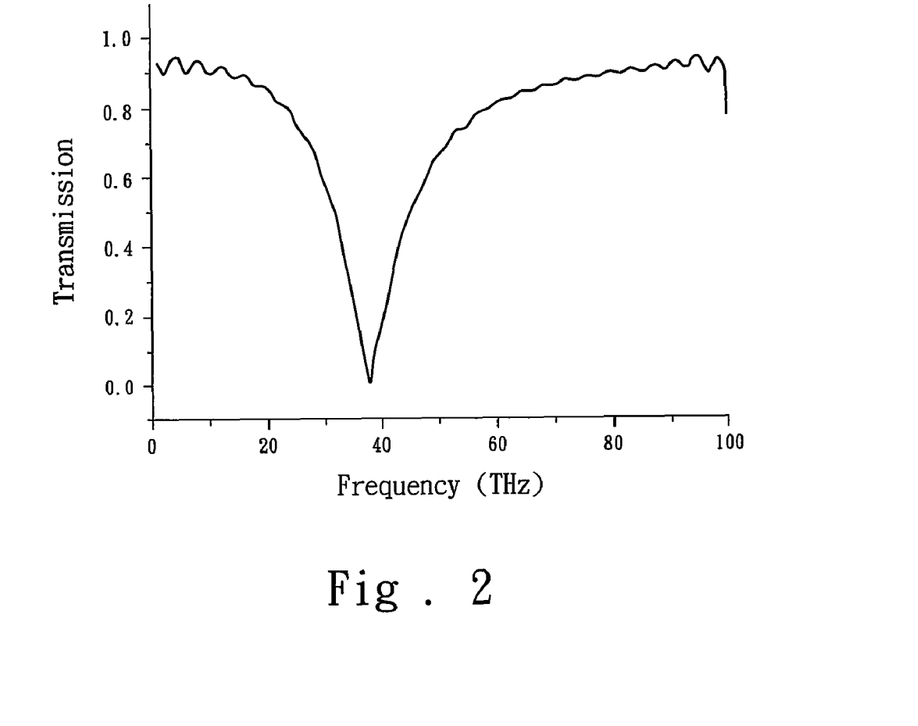
FIG. 2 is a diagram showing the relationship between the transmittances and the frequencies of electromagnetic waves incident into a first split-ring resonator according to the present invention.

Refer to from FIG. 1 to FIG. 6. In the present invention, a first split-ring resonator 11 and a second split-ring resonator 12 form a resonance structure 10. As shown in FIG. 1, the first split-ring resonator 11 is made of a conductive material selected from a group consisting of gold, silver, aluminum and copper. The first split-ring resonator 11 has a "U" shape with a containing space 111. The transmittances of different-frequency electromagnetic waves incident into the first split-ring resonator 11 are shown in FIG. 2.

Figure 3:
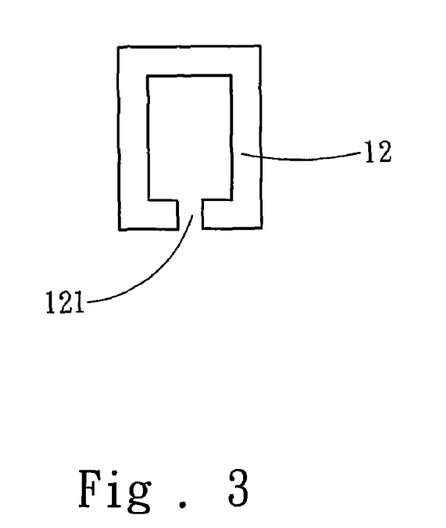
FIG. 3 is a diagram schematically showing a second split-ring resonator according to the present invention.
Figure 4:
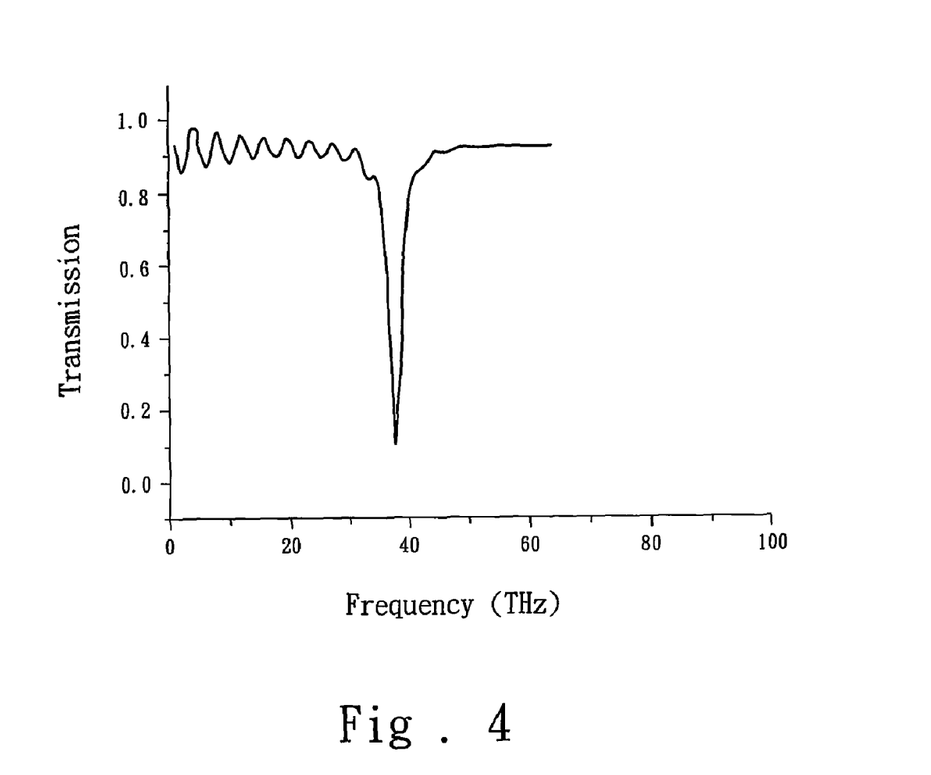
FIG. 4 is a diagram showing the relationship between the transmittances and the frequencies of electromagnetic waves incident into a second split-ring resonator according to the present invention.
Figure 5:
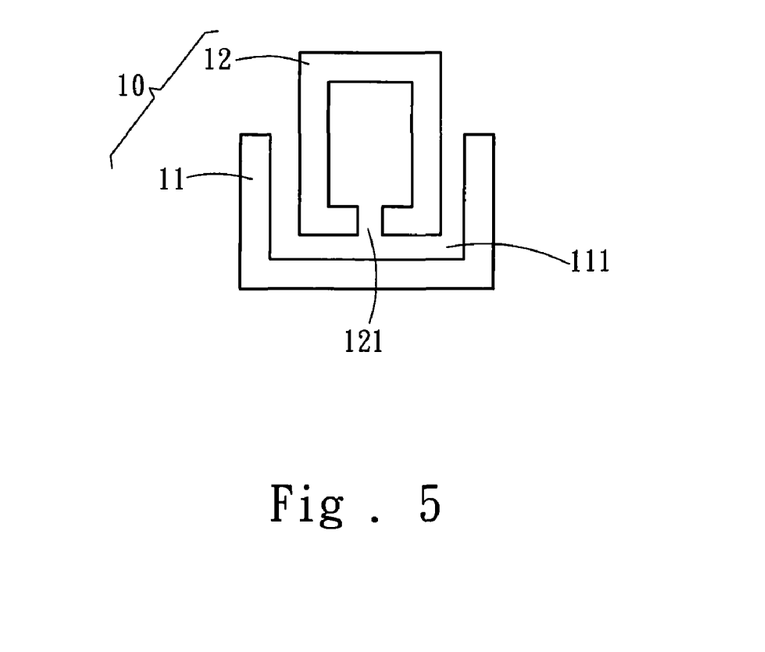
FIG. 5 is a diagram schematically showing a resonance structure according to the present invention.
Figure 6:
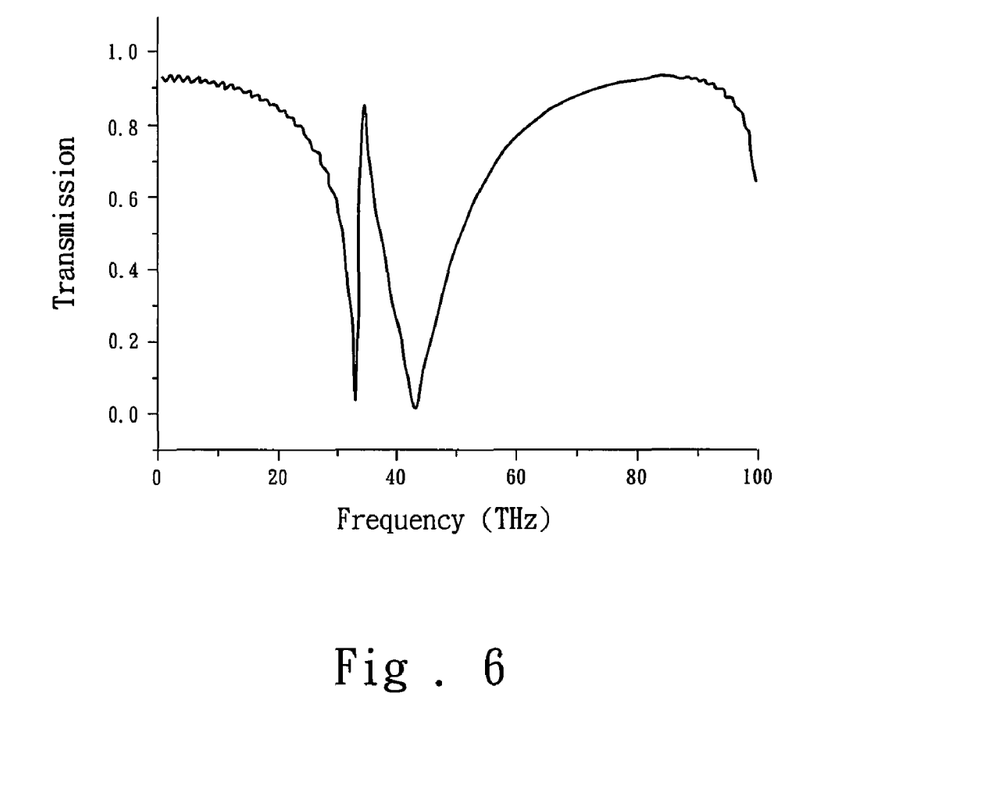
FIG. 6 is a diagram showing the relationship between the transmittances and the frequencies of electromagnetic waves incident into a resonance structure according to the present invention.

As shown in FIG. 3, the second split-ring resonator 12 is made of a conductive material selected from a group consisting of gold, silver, aluminum and copper. The second split-ring resonator 12 has a "rectangular loop" shape with a gap 121. The transmittances of different-frequency electromagnetic waves incident into the second split-ring resonator 12 are shown in FIG. 4. As shown in FIG. 5, the second split-ring resonator 12 is inserted into the containing space 111 with the gap 121 arranged inside the containing space 111 and faced downward to form the resonance structure 10. The spacing D between the first split-ring resonator 11 and the second split-ring resonator 12 varies from 10 to 600 nm. The transmittances of different-frequency electromagnetic waves incident into the resonance structure 10 are shown in FIG. 6. The electromagnetic wave with a frequency of 37 THz has a high transmittance and thus can generate an EIT phenomenon.

Figure 7:
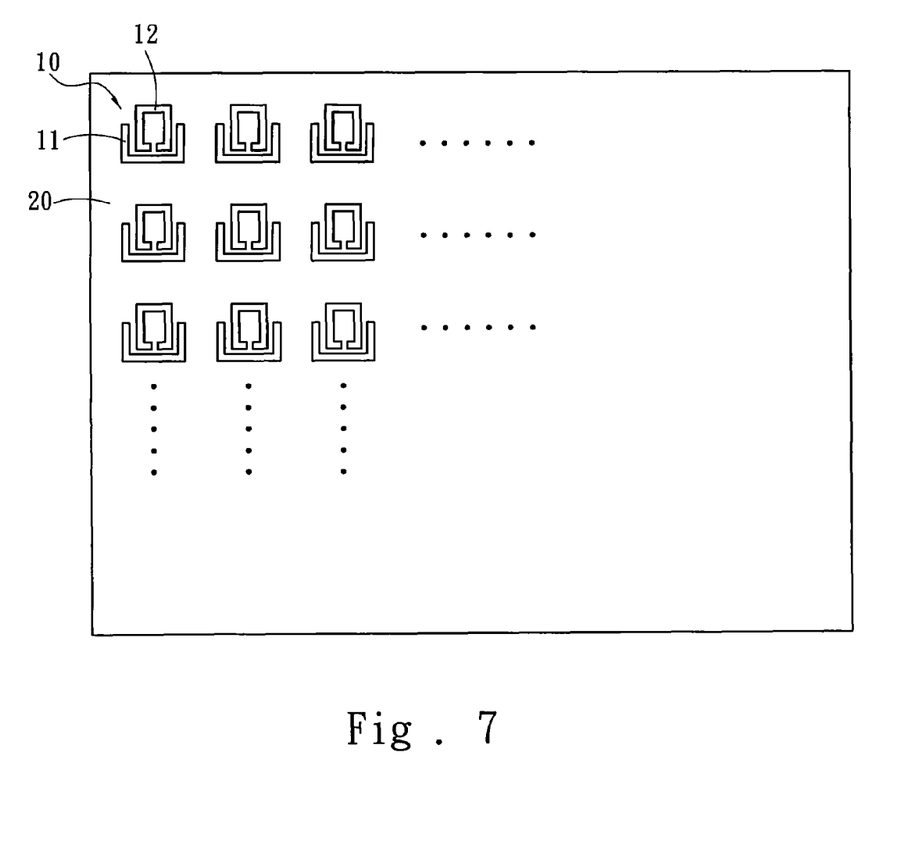
FIG. 7 is a diagram schematically showing the resonance structures formed on a chip according to the present invention.

Refer to FIG. 7, wherein the structures for EIT of the present invention are realized on a chip 20. The resonance structure 10 (i.e. the combination of the first split-ring resonator 11 and the second split-ring resonator 12) is made of a conductive metallic material.

The first split-ring resonators 11 and the second split-ring resonators 12 are arranged corresponding to each other one by one on the chip 20 to form an array of resonance structures 10.

Refer to from FIG. 8 to FIG. 13. In the present invention, the method for regulating the transmittance of an electromagnetic wave comprises steps:

providing a plurality of first split-ring resonators 11 each having a "U" shape with a containing space 111;

providing a plurality of second split-ring resonators 12 each having a "rectangular loop" shape with a gap 121 and inserted into the containing space 111 with the gap 121 arranged inside the containing space 111 and faced downward;

arranging the first split-ring resonators 11 and the second split-ring resonators 12 corresponding to each other one by one on a chip 20 to form an array of resonance structures 10 (shown in FIG. 7);

regulating the spacing D between the first split-ring resonator 11 and the second split-ring resonator 12; and providing an electromagnetic wave incident onto the resonance structures 10 with the incident direction thereof vertical to the plane of the resonance structures 10 and with the polarization direction of the electric field of the incident electromagnetic wave parallel to the gap 121.

Figure 8:
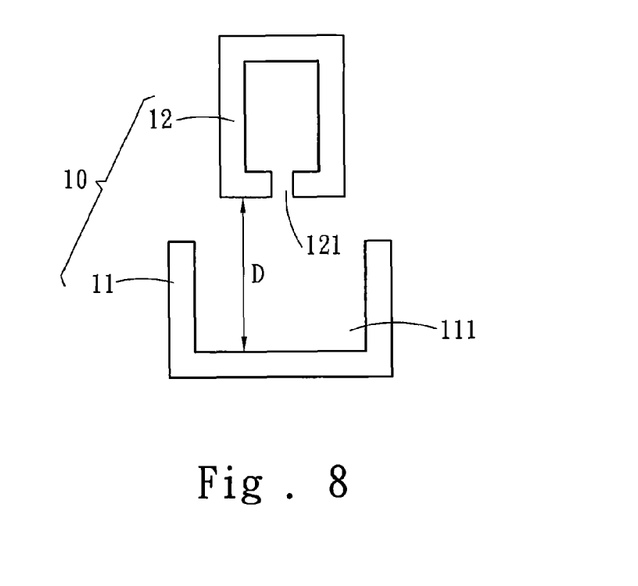
FIG. 8 is a diagram schematically showing that the resonance structure is modified to have a first spacing between the first split-ring resonator and the second split-ring resonator according to the present invention.
Figure 9:
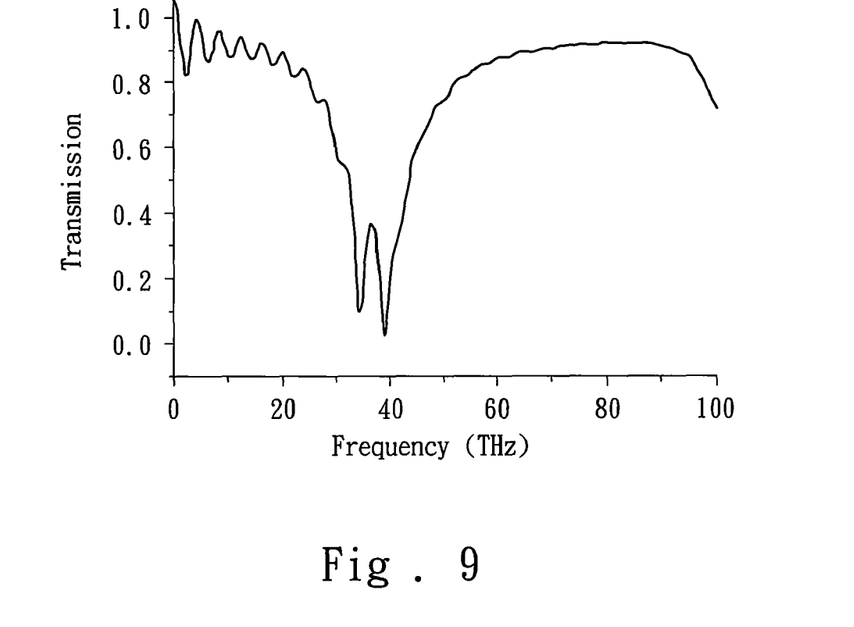
FIG. 9 is a diagram showing the relationship between the transmittances and the frequencies of electromagnetic waves incident into the resonance structure having the first spacing according to the present invention.
Figure 10:
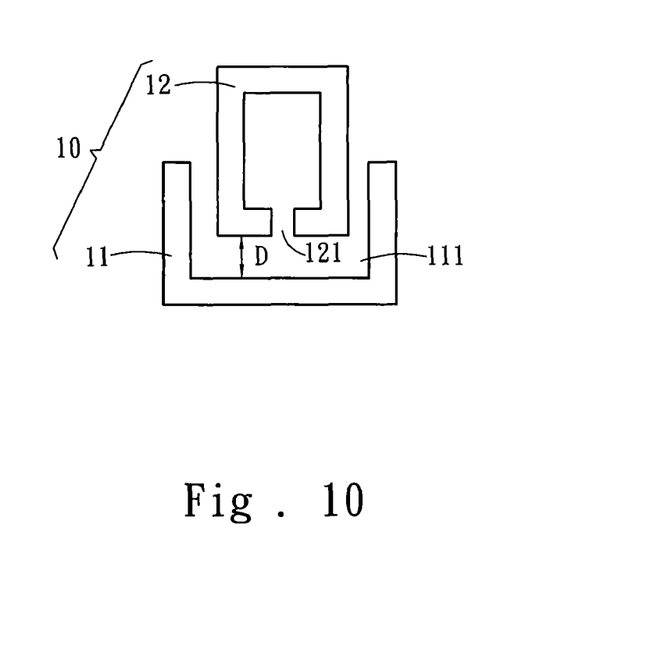
FIG. 10 is a diagram schematically showing that the resonance structure is modified to have a second spacing between the first split-ring resonator and the second split-ring resonator according to the present invention.
Figure 11:
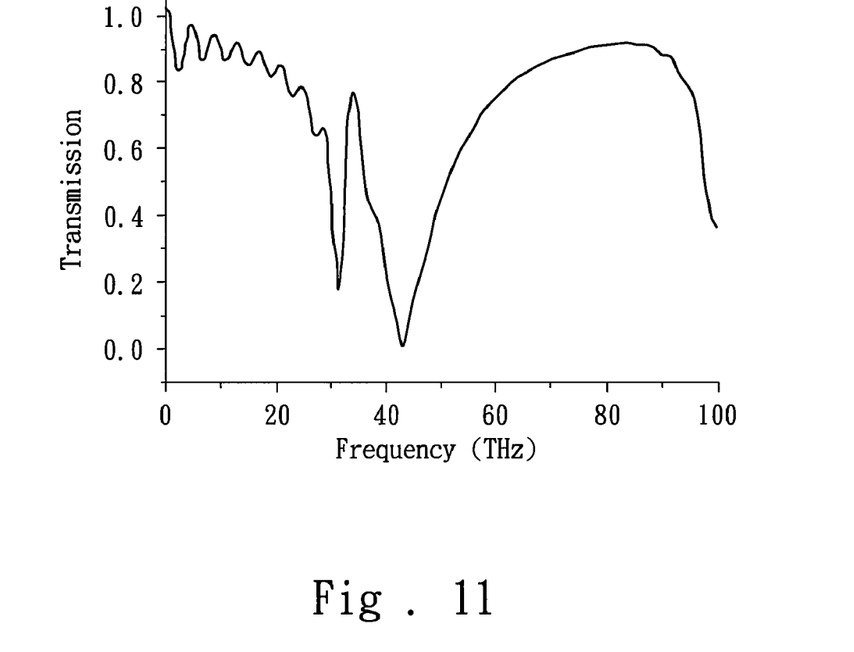
FIG. 11 is a diagram showing the relationship between the transmittances and the frequencies of electromagnetic waves incident into the resonance structure having the second spacing according to the present invention.
Figure 12:
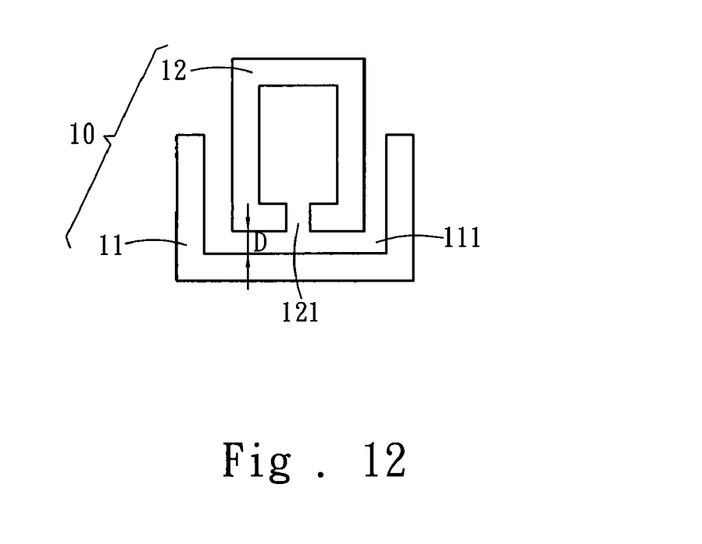
FIG. 12 is a diagram schematically showing that the resonance structure is modified to have a third spacing between the first split-ring resonator and the second split-ring resonator according to the present invention.
Figure 13:
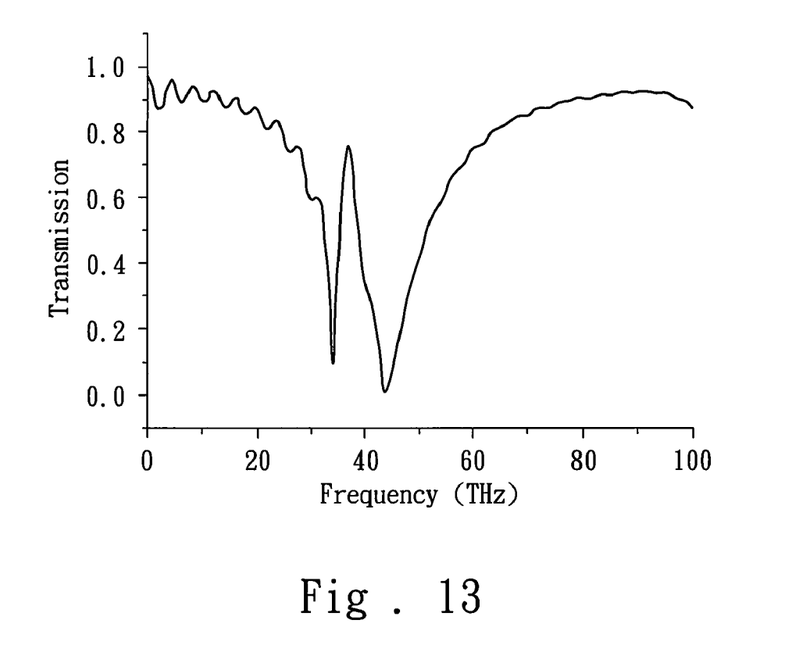
FIG. 13 is a diagram showing the relationship between the transmittances and the frequencies of electromagnetic waves incident into the resonance structure having the third spacing according to the present invention.
Figure 14:
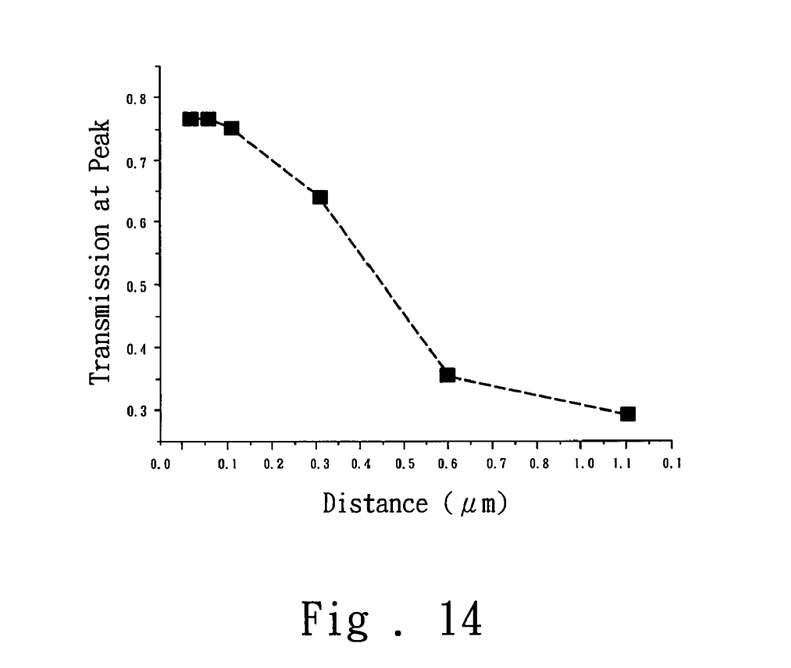
FIG. 14 is a diagram showing the relationship between the frequencies of the peak transmittance and the spacings between the first split-ring resonator and the second split-ring resonator according to the present invention.

The spacing D are varied through abovementioned method, as shown in FIG. 8, FIG. 10 and FIG. 12, and the transmittance increases with the decreasing spacing D, as shown in FIG. 9, FIG. 11 and FIG. 13. Furthermore, refer to FIG. 14 a diagram showing the relationship between the frequency of the peak transmittance and the spacing D between the first split-ring resonator 11 and the second split-ring resonator 12.

Figure 15:
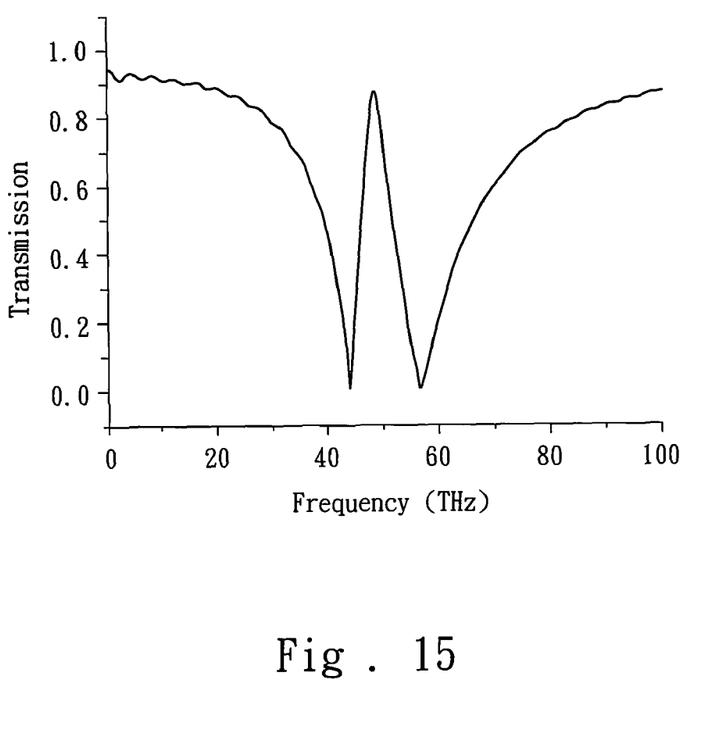
FIG. 15 is a diagram showing the relationship between the transmittances and the frequencies of electromagnetic waves incident into the resonance structure having another set of dimensions according to the present invention.

Refer to FIG. 15. Regulating the lengths of the first split-ring resonator 11 and the second split-ring resonator 12 can vary the frequency of EIT. When the first split-ring resonator 11 has a length of 1600 nm and the second split-ring resonator 12 has a length of 1500 nm, the frequency of EIT is 48 THz. Therefore, the present invention can accurately control the EIT frequency via regulating the lengths of the first split-ring resonator 11 and the second split-ring resonator 12.

Figure 16:
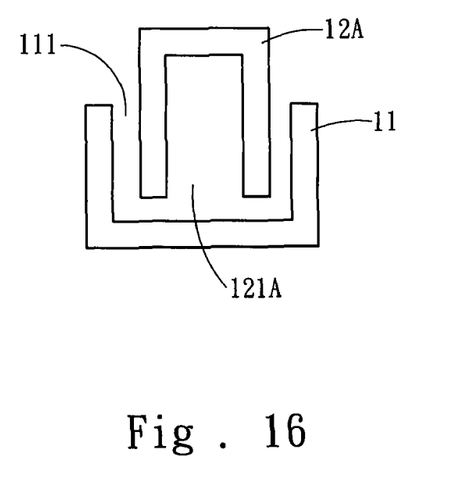
FIG. 16 is a diagram schematically showing another resonance structure according to the present invention.

Refer to FIG. 16. The second split-ring resonator 12A may alternatively have a "U" shape with an opening 121A. The second split-ring resonator 12 is also inserted into the containing space 111 with the opening 121A arranged inside the containing space 111 and faced downward, and EIT can also be induced thereby.

As described above, the present invention can achieve an EIT-like effect at the ambient temperature via applying a single electromagnetic wave and need only a plane wave to realize the EIT-like effect without a laser applying. Further, the EIT-inducing frequency correlates with the dimensions of the structure. Thus, the EIT-inducing frequency is no more confined by the characteristic of the material but can be arbitrarily controlled via regulating the dimensions of the structure. Therefore, the present invention can achieve the EIT-like effect in various situations and thus can expand the application field of EIT. Furthermore, the present invention realizes the resonance structures for EIT on a chip and thus can integrate with optical or electronic components.

What is claimed is:

1. A structure for realizing electromagnetically-induced transparency comprising a chip; and a plurality of resonance structures made of a conductive metallic material, arranged on said chip, and including a plurality of first split-ring resonators and a plurality of second split-ring resonators, wherein said first split-ring resonators and said second split-ring resonators are arranged corresponding to each other one by one on said chip to form an array of said resonance structures, and said first split-ring resonator has a "U" shape with a containing space, and said second split-ring resonator has a "rectangular loop" shape with a gap, wherein said second gapped-ring resonator is inserted into said containing space with said gap arranged inside said containing space and faced downward.

2. The structure for realizing electromagnetically-induced transparency according to claim 1, wherein said second split-ring resonator has a "U" shape with an opening; said second split-ring resonator is inserted into said containing space with said opening arranged inside said containing space and faced downward.

3. The structure for realizing electromagnetically-induced transparency according to claim 1, wherein said conductive metallic material of said resonance structure is selected from a group consisting of gold, silver, aluminum and copper.

4. The structure for realizing electromagnetically-induced transparency according to claim 1, wherein a spacing between said first split-ring resonator and said second split-ring resonator varies from 10 to 600 nm.

5. A method for regulating transmittance in electromagnetically-induced transparency, comprising:

providing a plurality of first split-ring resonators each having a "U" shape with a containing space;

providing a plurality of second split-ring resonators each having a "rectangular loop" shape with a gap and inserted into said containing space with said gap arranged inside said containing space and faced downward;

arranging said first split-ring resonators and said second split-ring resonators corresponding to each other one by one on a chip to form an array of resonance structures;

regulating a spacing between said first split-ring resonator and said second split-ring resonator; and providing an electromagnetic wave incident onto said resonance structures.

6. The method for regulating transmittance in electromagnetically-induced transparency according to claim 5, wherein said second split-ring resonator has a "U" shape with an opening; said second split-ring resonator is inserted into said containing space with said opening arranged inside said containing space and faced downward.

7. The method for regulating transmittance in electromagnetically-induced transparency according to claim 5, wherein said conductive metallic material of said first split-ring resonators and said second split-ring resonators is selected from a group consisting of gold, silver, aluminum and copper.

8. A method for regulating a frequency of an electromagnetic wave generating electromagnetically-induced transparency, comprising:

providing a plurality of first split-ring resonators each having a "U" shape with an containing space;

providing a plurality of second split-ring resonators each having a "rectangular loop" shape with a gap and inserted into said containing space with said gap arranged inside said containing space and faced downward;

arranging said first split-ring resonators and said second split-ring resonators corresponding to each other one by one on a chip to form an array of resonance structures;

regulating lengths of said first split-ring resonator and said second split-ring resonator; and providing an electromagnetic wave incident onto said resonance structures with an incident direction thereof vertical to a plane of said resonance structures and with a polarization direction of an electric field of said electromagnetic wave parallel to said gap.

9. The method for regulating a frequency of an electromagnetic wave generating electromagnetically-induced transparency according to claim 8, wherein said second split-ring resonator has a "U" shape with an opening; said second split-ring resonator is inserted into said containing space with said opening arranged inside said containing space and faced downward.

10. The method for regulating a frequency of an electromagnetic wave generating electromagnetically-induced transparency according to claim 8, wherein said conductive metallic material of said first split-ring resonators and said second split-ring resonators is selected from a group consisting of gold, silver, aluminum and copper.

* * * * *